United States Patent [19]

Schneider

[11] Patent Number: 5,254,038

[45] Date of Patent: * Oct. 19, 1993

[54] BALL TRIPLAN CONSTANT VELOCITY JOINT CENTERING SPRING

[75] Inventor: Dean J. Schneider, Highland, Mich.

[73] Assignee: GKN Automotive, Inc., Auburn Hills, Mich.

[ * ] Notice: The portion of the term of this patent subsequent to Nov. 3, 2009 has been disclaimed.

[21] Appl. No.: 824,554

[22] Filed: Jan. 23, 1992

[51] Int. Cl.$^5$ ............................................. F16D 3/205
[52] U.S. Cl. ................................. 464/111; 464/167; 464/905
[58] Field of Search ............... 464/111, 905, 167, 168; 384/49, 50, 51, 54, 57

[56] References Cited

U.S. PATENT DOCUMENTS

| | | | |
|---|---|---|---|
| 4,346,570 | 8/1982 | Nakamura et al. | 464/120 |
| 4,580,995 | 4/1986 | Orain | 464/111 |
| 4,619,628 | 10/1986 | Orain | 464/905 X |
| 4,684,356 | 8/1987 | Kimata et al. | 464/111 |
| 4,708,693 | 11/1987 | Orain | 464/111 |
| 4,741,723 | 5/1988 | Orain | 464/111 |
| 4,828,534 | 5/1989 | Orain | 464/111 |
| 5,061,223 | 10/1991 | Kadota et al. | 464/111 |
| 5,125,873 | 6/1992 | Welschof | 464/111 |
| 5,160,298 | 11/1992 | Schneider | 464/111 |

Primary Examiner—Daniel P. Stodola
Assistant Examiner—William G. Battista, Jr.
Attorney, Agent, or Firm—Harness, Dickey & Pierce

[57] ABSTRACT

A triplan constant velocity joint has an outer member, an inner member, shoes, rolling elements between the shoes and the outer member, and a positioning spring to position the rolling elements in relation to the inner member. The spring has a body with first and second arms for retaining the rolling elements with respect to the inner member. The spring also includes a retaining mechanism which both secures the spring to the inner member and provides a restoring force to position the rolling elements in relation to the inner member.

15 Claims, 2 Drawing Sheets

BALL TRIPLAN CONSTANT VELOCITY JOINT CENTERING SPRING

BACKGROUND OF THE INVENTION

The invention relates to universal joints. More particularly, the invention relates to a ball triplan constant velocity joint centering spring.

Triplan versions of tripod constant velocity joints have been used in the automotive industry for numerous years. The triplan constant velocity joint was developed to overcome shudder problems which are inherent in the standard design tripod joints.

A standard tripod joint has a bell shaped outer member having an internal cavity, an inner member, three annular rollers, and a plurality of needles. Each roller is positioned around a respective radially extending trunnion of the inner member. Journaled between the rollers and the trunnions are the plurality of needles. This arrangement enables for free rotation of the rollers relative to the trunnions. The inner member, rollers and needles are positioned in the internal cavity formed in the outer member. When operating at a zero degree angle, each roller rolls along a respective sidewall of the internal cavity of the outer member. This rolling action causes a low axial force, generated by rolling friction, to be exerted between the rollers and the outer member.

When the tripod joint is operating at an angle, the plane of the roller is skewed relative to the plane of the internal cavity. This skewed relationship causes a combination of rolling and sliding action of the roller relative to the outer member. As the angle of joint operation increases, the amount of sliding of the roller increases and the amount of rolling of the roller decreases.

This sliding action of the roller relative to the outer member generates a three per revolution pulsating axial load. This load can be transmitted through the outer member to other components within the vehicle and eventually will become noticeable and objectionable to the individuals riding in the vehicle. This objectionable vibration has been termed "shudder".

The triplan joints are designed to reduce or eliminate this shudder phenomena. The triplan joints separate the components within the joints which are responsible for accommodating the angular and translational movement of the joints. This separation of responsibilities allows the joints to utilize rolling friction instead of sliding friction to accomplish transitional movement of the joints when the joints are operating at an angle. With respect to frictional loading, rolling friction is significantly lower than sliding friction, and thus the magnitude of the axial load generated between the roller and the outer member is significantly reduced. This has the effect of reducing or eliminating shudder.

Unfortunately the amount of rolling travel available to these types of triplan joints is limited by the design of their internal components. In actual vehicle use, the travel requirement of the vehicle is beyond the rolling travel capabilities of these joints. Triplan joints have a specific amount of rolling travel available. This rolling travel is sufficient to accommodate engine movement and vibration as well as smaller suspension movements. When these triplan joints reach the end of their rolling travel, any additional travel is accommodated by a sliding action. Thus, the triplan joint, during sliding travel, has the same problems associated with conventional tripod joints.

This travel limitation problem is compounded by the migration of the internal components during operation of the joint. This migration of the internal components means that the maximum amount of rolling travel required is not always available to the joint. Thus it is not possible to determine or predict when rolling travel will be available.

In an attempt to overcome these problems of limited rolling travel, earlier designs of triplan joints incorporated a positioning mechanism for the internal components. This positioning mechanism was designed to insure that the maximum amount of rolling plunge was available to the joint at all times. Prior attempts at a positioning device have either been too expensive, too complicated for volume production or they have been found to be unreliable.

Accordingly, it is desirous to have a positioning means for a ball triplan joint which is relatively inexpensive and reliable.

SUMMARY OF INVENTION

The present invention discloses an improved telescopic ball triplan constant velocity universal joint. The present invention discloses an improved positioning mechanism for the telescopic ball triplan universal joint. The positioning mechanism continuously positions the balls with respect to the shoes to insure the availability of maximum allowable rolling travel. In addition to the positioning feature, the positioning mechanism also serves as an assembly aid. The internal joint components (e.g. the joint inner member, shoes, balls and positioning mechanism) are assembled into a subassembly which can easily be inserted into the outer joint member.

From the following detailed description of the present invention taken in conjunction with the accompanying drawings and claims, other objects and advantage of the present invention will become apparent to those skilled in the art.

DETAILED DESCRIPTION OF THE PREFERRED EMBODIMENT

Figure 1:
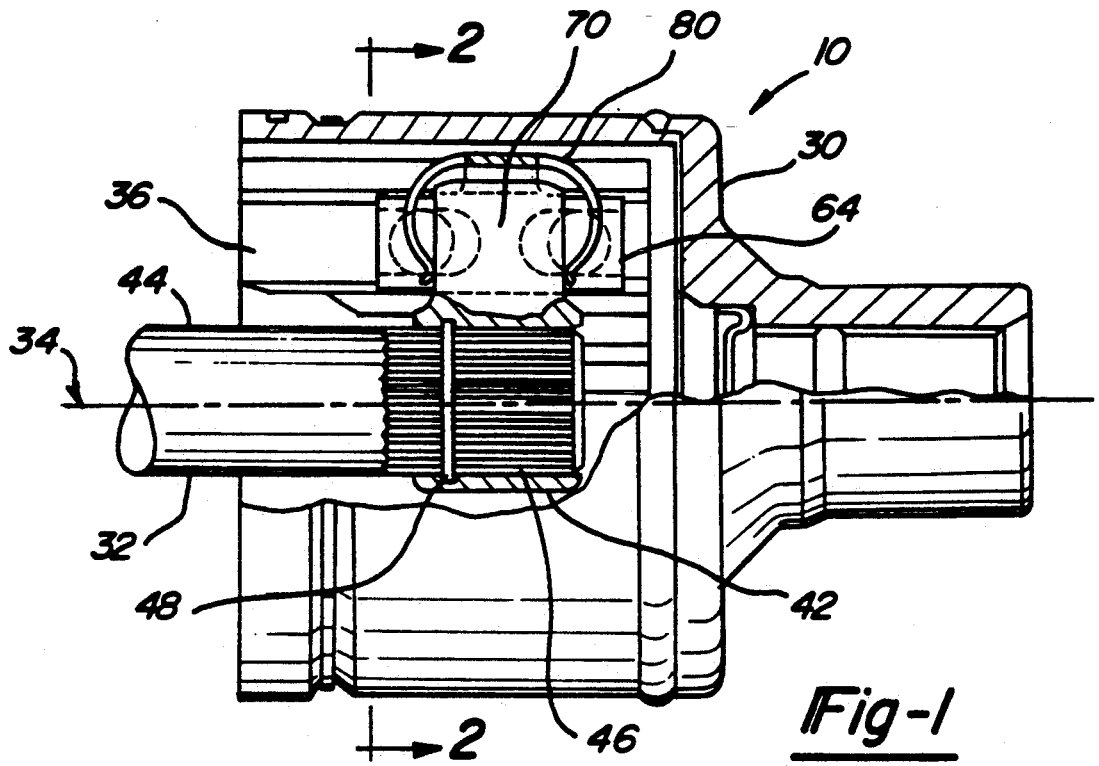
FIG. 1 is a side elevation view partially in cross section of the telescopic triplan assembly in accordance with the present invention.
Figure 2:
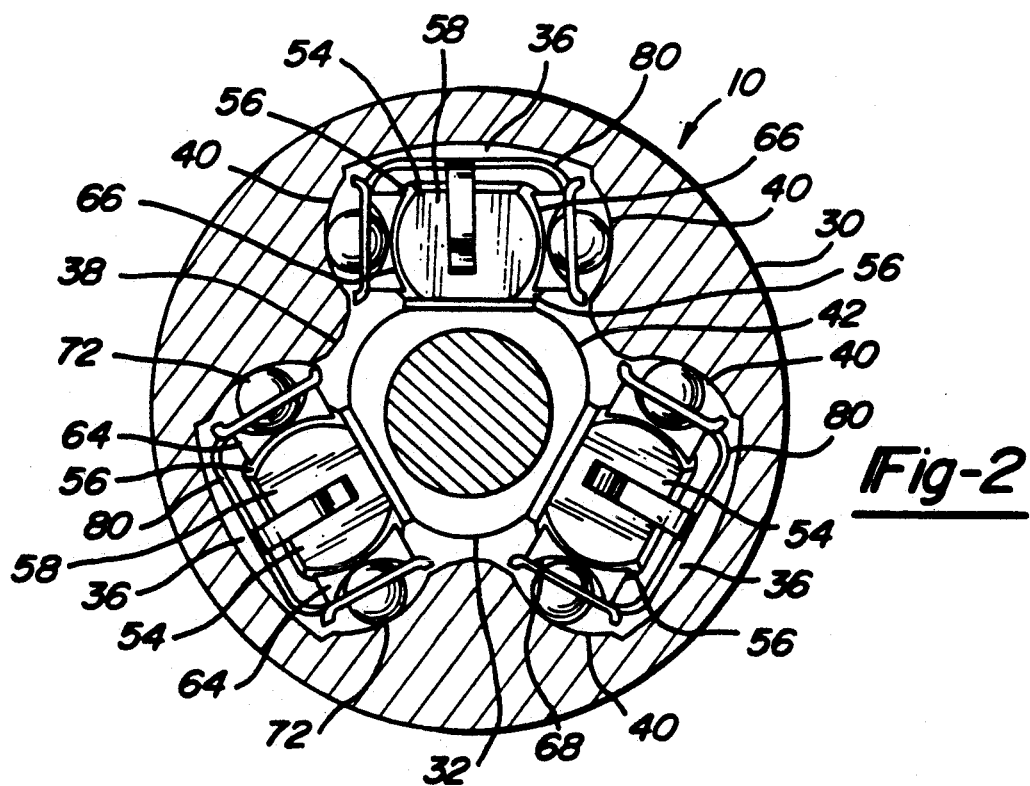
FIG. 2 is a sectional view of FIG. 1 along line 2—2 thereof.
Figure 3:
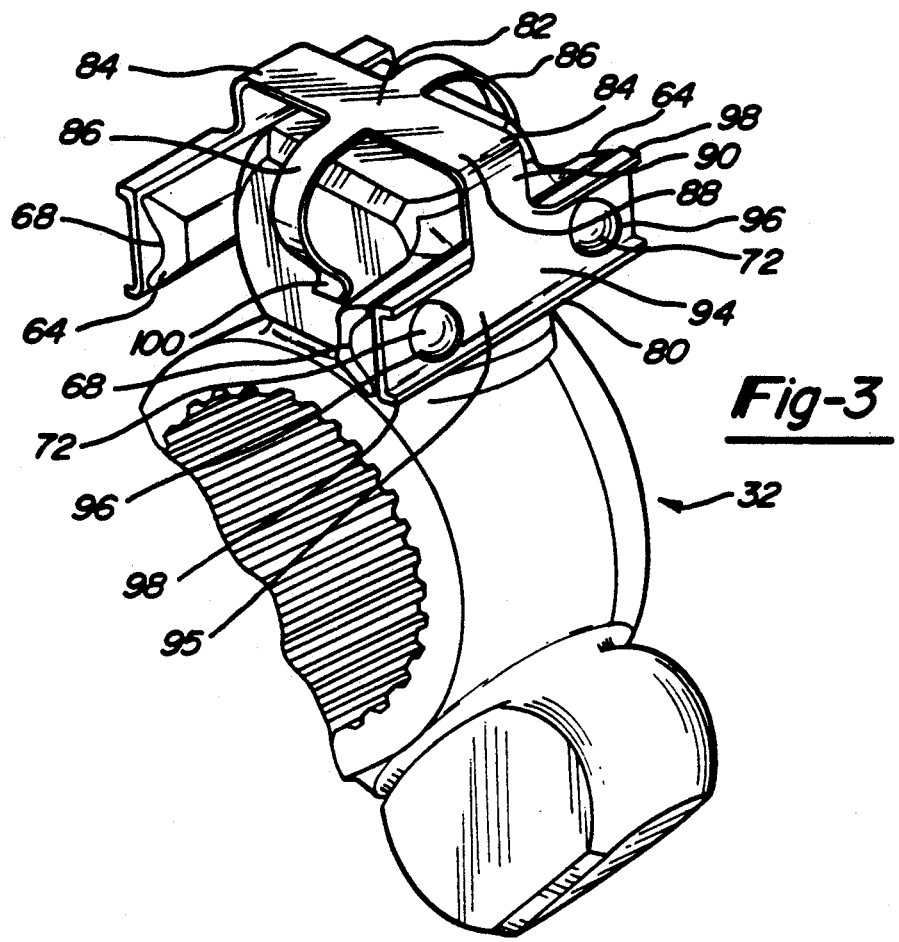
FIG. 3 is a perspective view of an inner joint member subassembly in accordance with the present invention.

A telescopic universal joint in accordance with the present invention is shown in FIGS. 1-3 and is designated by reference number 10. The telescopic triplan universal joint 10 has an outer joint member 30 and an inner joint member assembly 32.

The outer joint member 30 is a bell shaped housing and is rotatable about an axis 34. The bell shaped housing has three longitudinal chambers 36 formed in its interior wall 38. The chambers 36 are generally parallel to the axis 34. Each of the longitudinal chambers 36 are defined by opposing sidewalls 40 which are generally parallel to the axis 34.

The inner joint assembly 32 includes spider member 42, shaft 44, shoe 64, spherical balls 72 and positioning spring 80. The spider member 42 may be integral or separate with the shaft 44. When the spider member 42 is separate from the shaft 44, it is secured by spline means 46 and snap ring 48. The spider member 42 has three equally circumferentially spaced and radially extending trunnions 54. Each trunnion is adapted to extend into one of the chambers 36 as shown in FIG. 2. The trunnions 54 have a pair of partial spherical surfaces 56 and a pair of substantially flat surfaces 58.

A shoe 64 and a pair of spherical balls 72 are disposed between each of the trunnion spherical surfaces 56 and their respective sidewall 40. The shoes 64 each have a partial spherical surface 66 which is in contact with the respective trunnion partial spherical surface 56. A pair of partial cylindrical grooves 68 is located on the other side of shoe 64. The cylindrical grooves 68 are separated by a wall 70. The wall 70 is located at the mid point of shoe 64. The spherical balls 72 are in contact with both the partial cylindrical grooves 68 and the sidewall 40.

A positioning spring 80 retains the spherical balls 72 and the shoes 64 onto the trunnion 54. The spring 80 includes a body portion 82, a pair of arms 84 and a pair of spring fingers 86. one of the arms 84 extends from each end of the body 82. Each of the arms include a shoulder portion 88, an upper arm portion 90 and a lower arm portion 92. Shoulder 88 extends in a plane substantially parallel to the body 82. The shoulder curves downward into the integral upper arm portion 90 which is substantially perpendicular thereto. The lower arm includes a frame 94 defining a pair of circular apertures 96. The diameter of the circular apertures 96 is slightly less than the diameter of the spherical balls 72. This allows the positioning spring 80 to hold the spherical balls 72 in the inner joint subassembly 32 prior to insertion of the subassembly 32 into the outer member 30. A flange 98 at the outer longitudinal edges of the frame 94 is formed by bending the edges of the frame perpendicular to the frame body 95. The flange 98 provides stiffness to the frame 94.

The spring fingers 86 extend from the body 82 between each of the arms 84. The spring fingers are arcuate having an upturned free extending end 100. The free extending ends 100 of the fingers 86 are angled inward towards one another such that the fingers 86 spring apart when the trunnion 54 is positioned between them to retain the spring 80 onto the trunnion 54 as illustrated in FIG. 3. The spring fingers 86 position the spherical balls 72, in a predetermined position in the partial cylindrical grooves 68. The position of the shoe 64 is determined by the mating of the partial spherical surface 56 of the trunnion and partial spherical surface 66 of the shoe. During longitudinal movement of the shoe 64 with respect to the spherical balls 72, the spring fingers 86 deflect to produce a force which tends to reposition the spherical balls 72 to their predetermined position.

Upon operation of the joint 10 under torque, the shoe 64 moves longitudinally which, in turn, rolls the spherical balls 72 along the longitudinal sidewalls 40 providing rolling travel of the trunnion 54 relative to the longitudinal sidewalls 40. This travel is a result of both angular and telescoping movement of the joint. After a predetermined amount of travel, one of the spherical balls 72 contacts the wall 70 formed in the shoe 64. The amount of total rolling travel is determined by the length of the partial cylindrical groove 68 and the diameter of the spherical balls 72. Any further travel of the trunnion 54 relative to the longitudinal sidewalls 40 will be achieved by the sliding of the spherical balls 72.

During elongation movement or angular changes under torque on the joint, the spherical balls 72 are displaced away from their predetermined position with respect to the shoe 64 or trunnion 54. This displacement creates a repositioning force in the spring fingers 86 which returns the spherical balls 72 to their predetermined position upon the removal of torque. By repositioning the spherical balls 72 relative to the trunnion 54 and shoe 64, the joint 10 will again function as a rolling telescopic joint rather than a sliding telescopic joint.

Figure 4:
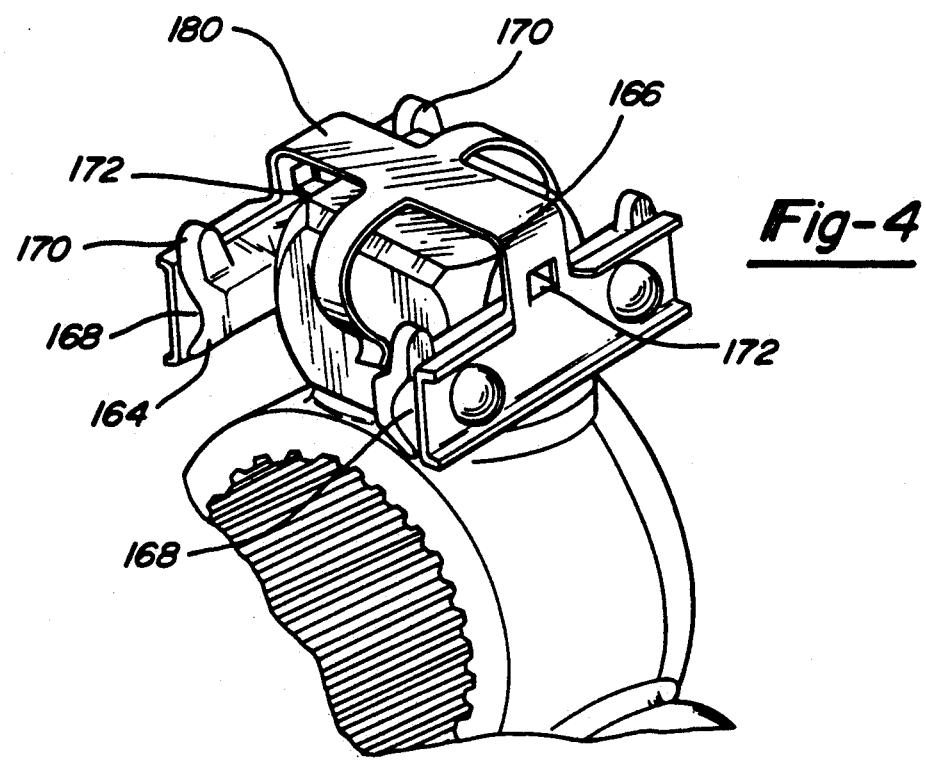
FIG. 4 is a perspective view of an inner joint member subassembly in accordance with another embodiment of the present invention.

FIG. 4 shows another embodiment of the present invention. This embodiment is identical to the embodiment shown in FIGS. 1-3 except for the stop mechanism. The components for this embodiment which are identical to the embodiment shown in FIGS. 1-3 are designated with the same reference numerals.

Referring now to FIG. 4, a shoe 164 and a pair of spherical balls 72 are disposed between each of the trunnion spherical surfaces 56 and their respective sidewall 40. The shoes 164 each have a partial spherical surface 166 which is in contact with the respective trunnion spherical surface 56. A partial cylindrical groove 168 extends the entire length of the shoe and is located in the side opposite the partial spherical surface 166. A tab 170 is formed on each end of the shoe 164 as shown in FIG. 4.

A positioning spring 180 retains the spherical balls 72 and the shoes 164 onto the trunnion 54. The position spring 180 is identical to the positioning spring 80 described in the previous embodiment except for the addition of a pair of fingers 172.

Each finger 172 is formed out of the upper arm portion 90 of the positioning spring 180. Each finger is substantially perpendicular to the upper arm portion 90 and extends towards the spring fingers 86. in an assembled joint, the fingers 172 are positioned between the tabs 170 formed on the shoe 164.

Upon operation of the joint under torque, the shoe 164 moves longitudinally which, in turn, rolls the spherical balls 72 along the longitudinal sidewalls 40 providing rolling travel of the trunnion 54 relative to the longitudinal sidewalls 40. This travel is a result of both angular and telescopic movement of the joint. After a predetermined amount of travel, the finger 172 contacts one of the tabs 170 formed on the shoe 164. The amount of total rolling travel is determined by the width of the fingers 172 and the distance between the tabs 170. Any further travel of the trunnion 54 relative to the longitudinal sidewalls 40 will be achieved by the sliding of the spherical balls 72. The generation of a repositioning force in the spring fingers 86 is identical to the previous embodiment.

While the above detailed description describes the preferred embodiment of the present invention, it should be understood that the present invention is susceptible to modification, variation and alteration without deviating from the scope and fair meaning of the subjoined claims.

I claim:

1. A positioning spring for positioning a plurality of rolling elements with respect to a trunnion member of a triplan universal joint, said spring comprising:
a body having a first and second end;
first arm means including a first frame extending from said first end of said body, said first frame defining a first pair of apertures, each aperture of said first pair of apertures retaining one rolling element of said plurality of rolling elements with respect to said trunnion member of said triplan universal joint;

second arm means including a second frame extending from said second end of said body, said second frame defining a second pair of apertures, each aperture of said second pair of apertures retaining one rolling element of said plurality of rolling elements with respect to said trunnion member of said triplan universal joint;

resilient retaining means for securing said position spring to said trunnion member of said universal joint and for positioning at least one of said plurality of rolling elements with respect to said trunnion member, said resilient retaining means interposed between said first and second arm means and extending from said body.

2. The positioning spring according to claim 1 wherein said resilient retaining means includes a pair of spring fingers extending from opposite sides of said body between said first and second arm means, said spring fingers each having free ends, said free ends being spaced from one another such that they frictionally retain said spring on said trunnion.

3. The positioning spring according to claim 2 wherein said first and second spring fingers are arcuately shaped.

4. The positioning spring according to claim 2 wherein said free ends of said first and second spring fingers are partially spherical.

5. The positioning spring according to claim 1 wherein said first frame includes stopping means for limiting the amount of travel of a shoe relative to said first frame.

6. The positioning spring according to claim 1 wherein said second frame includes stopping means for limiting the amount of travel of a shoe relative to said second frame.

7. A telescopic triplan universal joint comprising:
an outer joint member having at least three longitudinal disposed chambers, each chamber having a pair of oppositely disposed longitudinal sidewalls;
an inner joint member disposed within said outer joint member, said inner joint member having at least three extending trunnions, each trunnion extending into a respective chamber of said at least three chambers between said oppositely disposed longitudinal sidewalls, each of said trunnions having at least a first partial spherical surface facing each of said longitudinal sidewalls provided in said respective chamber into which it extends;
a plurality of rolling elements, each rolling element having a first bearing surface rollingly engaged with a respective one of said longitudinal sidewalls;
a plurality of shoes, each shoe having a second partial spherical surface engaged with said first partial spherical surface of each of said radially extending trunnions and having at least one partial cylindrical bearing surface engaged with said respective first bearing surface of said plurality of rolling elements;
a plurality of positioning springs, each positioning spring resiliently attached to a respective trunnion for positioning at least to of said plurality of rolling elements in a predetermined position relative to said trunnion such that during longitudinal movement of said rolling elements with respect to said trunnion, said positioning spring deflects producing a force which tends to reposition said rolling elements to said predetermined position.

8. The telescopic triplan universal joint according to claim 7 wherein each of said positioning springs comprises:
a body having a first and second end;
first arm means for retaining at least one of said plurality of rolling elements on a respective trunnion of said triplan universal joint, said first arm means extending from said first end of said body;
second arm means for retaining at least one of said plurality of rolling elements on said respective trunnion of said triplan universal joint, said second arm means extending from said second end of said body;
resilient retaining means for securing said positioning spring to said respective trunnion of said universal joint and for positioning at least one of said plurality of rolling elements with respect to said trunnion, said resilient retaining means interposed between said first and second arm means and extending from said body.

9. The positioning spring according to claim 8 wherein said resilient retaining means includes a pair of spring fingers extending from opposite sides of said body between said first and second arm means, said spring fingers each having free ends, said free ends being spaced from one another such that they frictionally retain said spring on said trunnion.

10. The positioning spring according to claim 9 wherein said first and second spring fingers are arcuately shaped.

11. The positioning spring according to claim 9 wherein said free ends of said first and second spring fingers are partially spherical.

12. The positioning spring according to claim 8 wherein said first arm means includes a frame extending from said body, said frame defining at least one aperture for retaining at least one of said plurality of rolling elements.

13. The positioning spring according to claim 12 wherein said frame includes stopping means for limiting the amount of travel of said shoe relative to said frame.

14. The positioning spring according to claim 8 wherein said second arm means includes a frame extending from said second arm means, said frame defining at least one aperture for retaining at least one of said plurality of rolling elements.

15. The positioning spring according to claim 14 wherein said frame includes stopping means for limiting the amount of travel of said shoe relative to said frame.

* * * * *